United States Patent
Benameur et al.

(10) Patent No.: US 9,953,158 B1
(45) Date of Patent: Apr. 24, 2018

(54) SYSTEMS AND METHODS FOR ENFORCING SECURE SOFTWARE EXECUTION

(71) Applicant: Symantec Corporation, Mountain View, CA (US)

(72) Inventors: Azzedine Benameur, Fairfaix Station, VA (US); Nathan Evans, Sterling, VA (US)

(73) Assignee: Symantec Corporation, Mountain View, CA (US)

( * ) Notice: Subject to any disclaimer, the term of this patent is extended or adjusted under 35 U.S.C. 154(b) by 315 days.

(21) Appl. No.: 14/691,602

(22) Filed: Apr. 21, 2015

(51) Int. Cl.
| G06F 11/00 | (2006.01) |
| G06F 12/14 | (2006.01) |
| G06F 12/16 | (2006.01) |
| G08B 23/00 | (2006.01) |
| G06F 21/52 | (2013.01) |
| G06F 21/57 | (2013.01) |
| G06F 9/30  | (2006.01) |

(52) U.S. Cl.
CPC ............ G06F 21/52 (2013.01); G06F 21/572 (2013.01); *G06F 9/3005* (2013.01); *G06F 2221/033* (2013.01)

(58) Field of Classification Search
CPC ...... G06F 21/50–21/577; G06F 9/3005; G06F 21/565–21/566; G06F 2221/033
See application file for complete search history.

(56) References Cited

U.S. PATENT DOCUMENTS

| 8,645,923 B1* | 2/2014 | Satish | G06F 9/44589 |
| | | | 717/131 |
| 2006/0101413 A1* | 5/2006 | Kinno | G06F 11/0715 |
| | | | 717/127 |
| 2006/0161978 A1* | 7/2006 | Abadi | G06F 21/52 |
| | | | 726/22 |
| 2007/0107057 A1* | 5/2007 | Chander | G06F 21/54 |
| | | | 726/22 |
| 2010/0023810 A1* | 1/2010 | Stolfo | G06F 11/3652 |
| | | | 714/38.11 |
| 2012/0159630 A1* | 6/2012 | Wang | G06F 21/54 |
| | | | 726/24 |

(Continued)

OTHER PUBLICATIONS

N. Provos, Improving Host Security with System Call Policies, Nov. 11, 2002.*

(Continued)

*Primary Examiner* — Trong Nguyen
(74) *Attorney, Agent, or Firm* — FisherBroyles, LLP

(57) ABSTRACT

The disclosed computer-implemented method for enforcing secure software execution may include (1) providing at least one known benign input to an executable file that is susceptible to abnormal code execution, (2) observing a series of function calls made by the executable file as the executable file processes the known benign input, (3) storing the series of function calls as a control flow graph that represents known safe function call pathways for the executable file, and (4) forcing a subsequent execution of the executable file to follow the series of function calls stored in the control flow graph to protect the executable file against abnormal code execution. Various other methods, systems, and computer-readable media are also disclosed.

20 Claims, 7 Drawing Sheets

(56) References Cited

U.S. PATENT DOCUMENTS

| | | | | |
|---|---|---|---|---|
| 2014/0007184 A1* | 1/2014 | Porras | ................ | G06F 21/53 726/1 |
| 2014/0090054 A1* | 3/2014 | Bolzoni | ............ | H04L 63/0245 726/22 |
| 2014/0298300 A1* | 10/2014 | Rhee | ................ | G06F 11/3466 717/127 |
| 2016/0300060 A1* | 10/2016 | Pike | ................ | G06F 17/30371 |

OTHER PUBLICATIONS

Abadi, Martín et al., "Control-Flow Integrity—Principles, Implementations, and Applications", http://research.microsoft.com/pubs/64250/ccs05.pdf, as accessed Feb. 27, 2015, CCS'05, Alexandria, Virginia, (Nov. 7-11, 2005).

Zhang, Chao et al., "Practical Control Flow Integrity & Randomization for Binary Executables", http://www.cs.berkeley.edu/~dawnsong/papers/Oakland2013-CCFIR-CR.pdf, as accessed Feb. 27, 2015, IEEE Symposium on Security and Privacy (SP), 2013, Berkeley, CA, (May 19-22, 2013).

Zhang, Mingwei et al., "Control Flow Integrity for COTS Binaries", http://0b4af6cdc2f0c5998459-c0245c5c937c5dedcca3f1764ecc9b2f.r43.cf2.rackcdn.com/12313-sec13-paper_zhang.pdf, as accessed Feb. 27, 2015, Proceedings of the 22nd USENIX Security Symposium, USENIX Association, Washington, D.C., (Aug. 14-16, 2013), pp. 337-352.

* cited by examiner

SYSTEMS AND METHODS FOR ENFORCING SECURE SOFTWARE EXECUTION

BACKGROUND

Attackers may seek to execute arbitrary code on a computing device, leveraging vulnerabilities in software to execute code of their choosing. Additionally, users may unintentionally cause software to exhibit erratic behavior that causes the software to crash or otherwise harm the users' system. In either case, problems may arise when software deviates from intended control flows. Accordingly, users may seek methods by which to force software to follow intended control flows.

Traditional methods for enforcing intended control flows typically rely on static analysis of the assembly code that makes up software. Unfortunately, such static analysis may not accurately represent how the software behaves when provided with various inputs. For example, enforcement schemes that utilize static software analysis may permit functions to behave in a manner that certain end users may never encounter during normal use of the software. Moreover, individuals or organizations may seek solutions that are faster and require less processing overhead than enforcement solutions that incorporate static analysis. The instant disclosure therefore identifies and addresses a need for additional and improved systems and methods for enforcing secure software execution.

SUMMARY

As will be described in greater detail below, the instant disclosure describes various systems and methods for enforcing secure software execution by (1) examining and recording function calls made by software as it executes under controlled conditions and (2) forcing subsequent executions of the software to follow the recorded pattern of function calls. In one example, a computer-implemented method for enforcing secure software execution may include (1) providing at least one known benign input to an executable file that is susceptible to abnormal code execution, (2) observing a series of function calls made by the executable file as the executable file processes the known benign input, (3) storing the series of function calls as a control flow graph that represents known safe function call pathways for the executable file, and (4) forcing a subsequent execution of the executable file to follow the series of function calls stored in the control flow graph to protect the executable file against abnormal code execution.

In some examples, the step of forcing the subsequent execution of the executable file to follow the series of function calls stored in the control flow graph may include (1) monitoring, as part of a supervisor process, function calls issued by the executable file, (2) detecting, as part of the supervisor process, an errant function call issued by the executable file that does not follow the series of function calls stored in the control flow graph, and (3) performing, as part of the supervisor process, a security action to protect the executable file against abnormal code execution.

In some embodiments, the step of performing the security action may include (1) blocking the errant function call issued by the executable file, (2) creating an entry in a security log that reports the errant function call, and/or (3) terminating the execution of the executable file. In some examples, the step of blocking the errant function call issued by the executable file may include blocking the errant function call from resolving and/or returning an empty function in response to the errant function call. In some examples, the step of performing the security action may include (1) obtaining verification from a user that the errant function call follows an expected series of function calls that is not stored in the control flow graph and (2) allowing the errant function call to resolve in response to obtaining the verification.

In further embodiments, the step of forcing the subsequent execution of the executable file to follow the series of function calls stored in the control flow graph may include degrading the executable file. In one example, degrading the executable file may include generating a degraded executable file that is a copy of the executable file where at least one function of the executable file not represented in the control flow graph has been degraded. In such embodiments, forcing the subsequent execution of the executable file to follow the series of function calls stored in the control flow graph may include executing the degraded executable file in place of the executable file.

In one embodiment, the step of providing the known benign inputs to the executable file may include providing known benign inputs of a particular file type. In such embodiments, the step of forcing subsequent executions of the executable file to follow the series of function calls stored in the control flow graph may include determining that a type of an untested input provided to the subsequent execution of the executable file matches the file type of the benign inputs.

In other embodiments, the providing step, the observing step, and the storing step may be performed by a server. In such an embodiment, the forcing step may include providing the control flow graph to a client system that executes the subsequent execution of the executable file.

In some embodiments, a system for implementing the above-described method may include (1) a providing module, stored in memory, that provides at least one known benign input to an executable file that is susceptible to abnormal code execution, (2) an observing module, stored in memory, that observes a series of function calls made by the executable file as the executable file processes the known benign input, (3) a storing module, stored in memory, that stores the series of function calls as a control flow graph that represents known safe function call pathways for the executable file, (4) a forcing module, stored in memory, that forces a subsequent execution of the executable file to follow the series of function calls stored in the control flow graph to protect the executable file against abnormal code execution, and (5) at least one physical processor configured to execute the providing module, the observing module, the storing module, and the forcing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) provide at least one known benign input to an executable file that is susceptible to abnormal code execution, (2) observe a series of function calls made by the executable file as the executable file processes the known benign input, (3) store the series of function calls as a control flow graph that represents known safe function call pathways for the executable file, and (4) force a subsequent execution of the executable file to follow the series of function calls stored in the control flow graph to protect the executable file against abnormal code execution.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
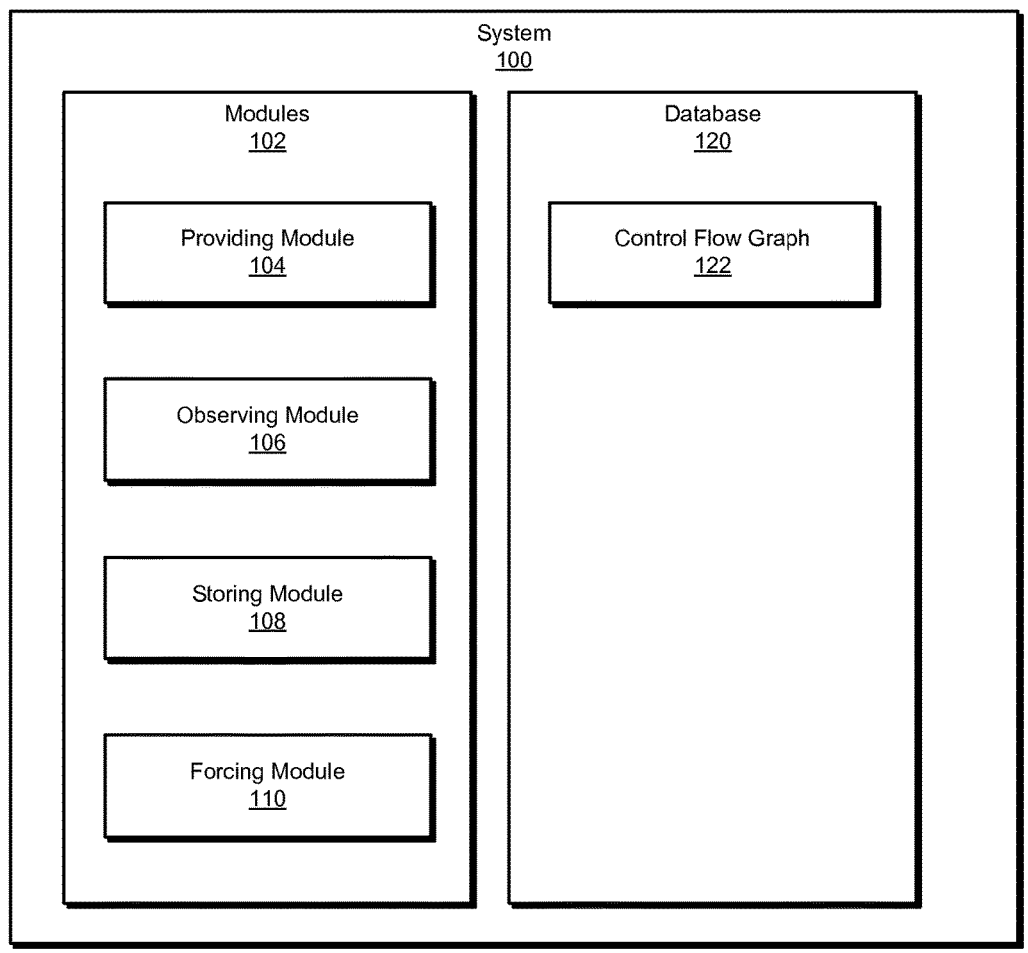
FIG. 1 is a block diagram of an exemplary system for enforcing secure software execution.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for enforcing secure software execution. As will be explained in greater detail below, by examining and recording function calls made by an executable file as it executes under controlled conditions and causing later executions of the executable file to follow the recorded pattern of function calls, the systems and methods described herein may ensure that the later executions of the executable file do not deviate from expected behaviors. Further, the dynamic analysis of executable files performed by the systems described herein may reduce the overhead and system requirements required to enforce secure software execution. Embodiments of the instant disclosure may also provide various other advantages and features, as discussed in greater detail below.

Figure 2:
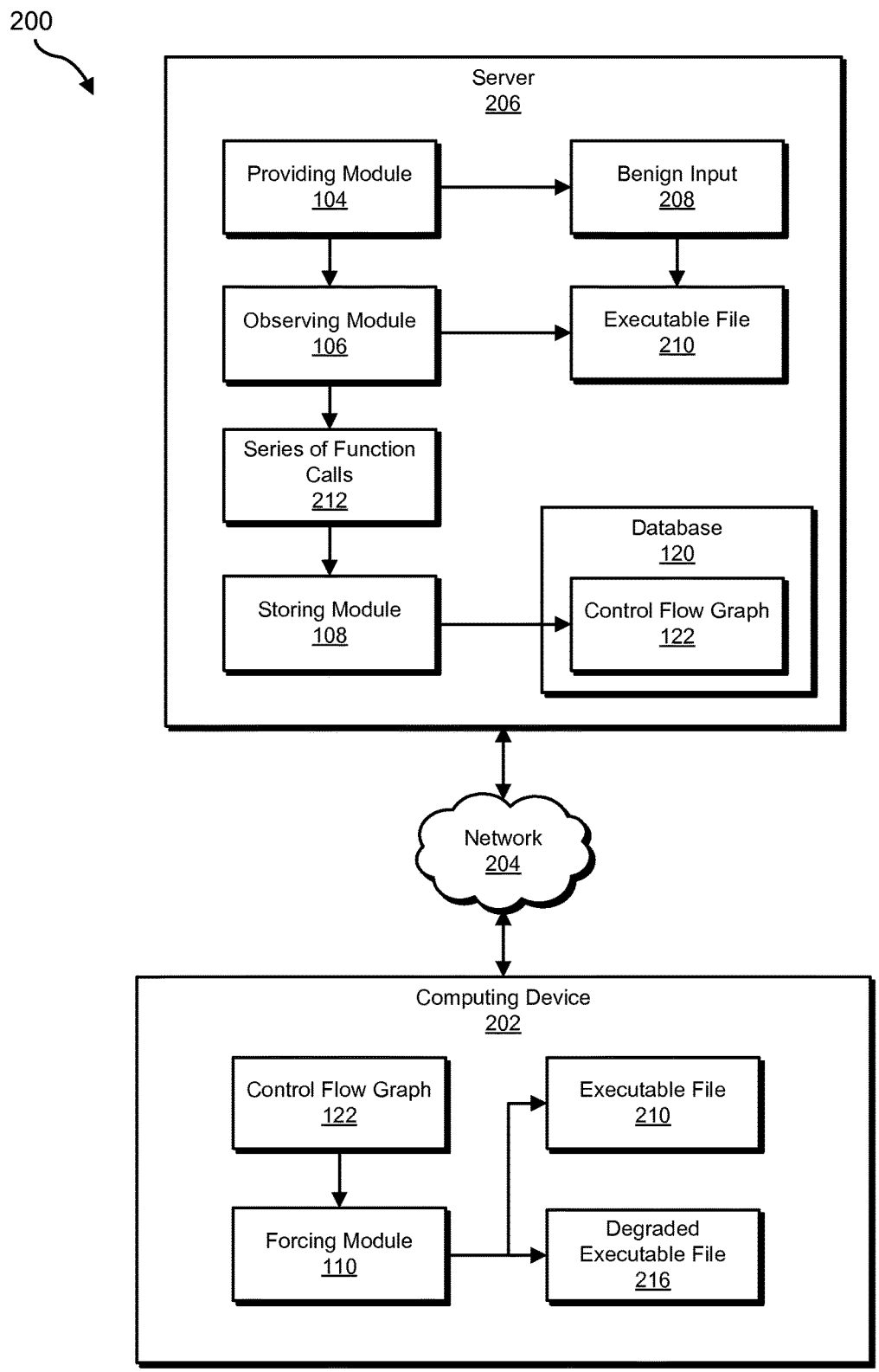
FIG. 2 is a block diagram of an additional exemplary system for enforcing secure software execution.
Figure 4:
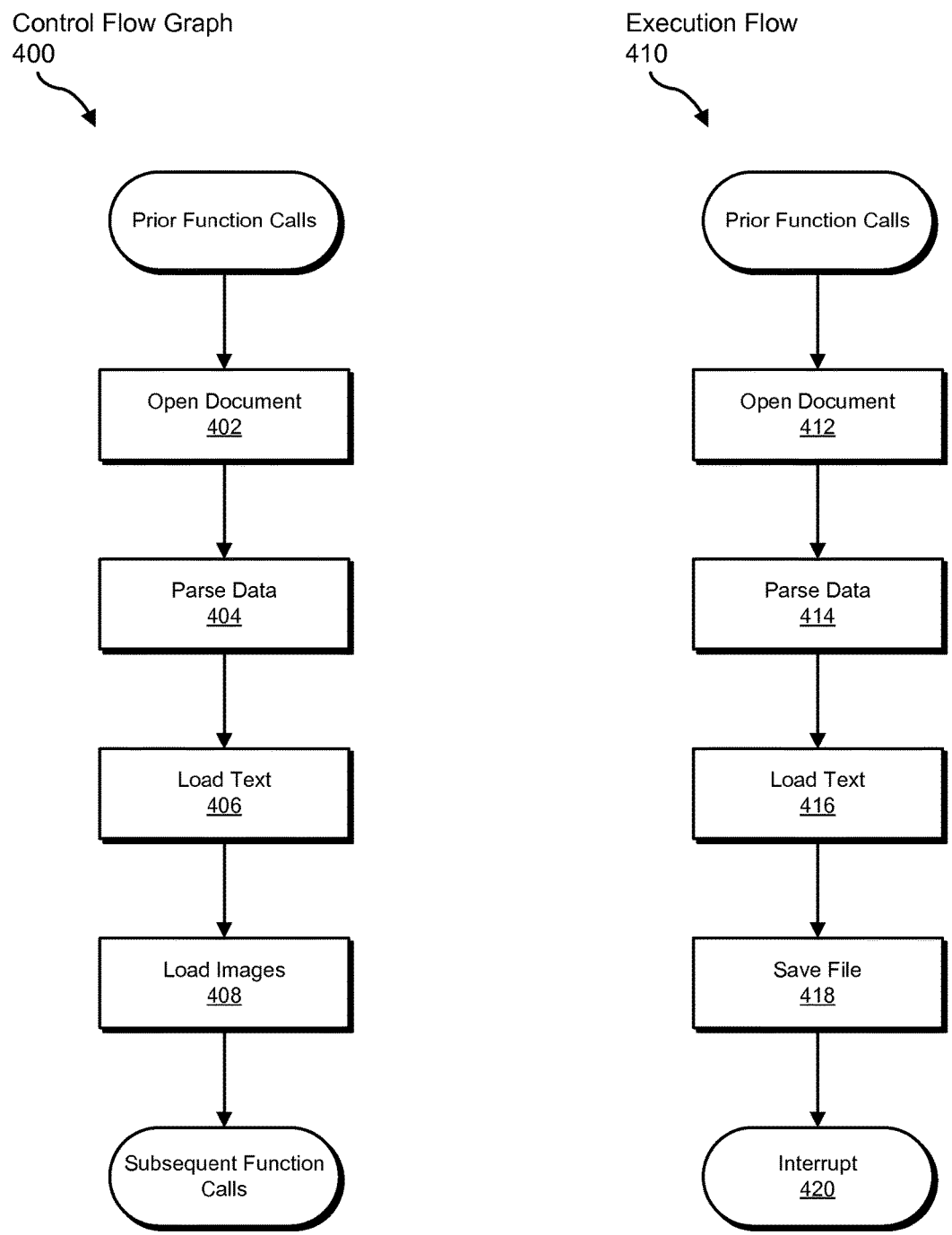
FIG. 4 is a flow diagram of an exemplary control flow graph and an exemplary execution flow.
Figure 5:
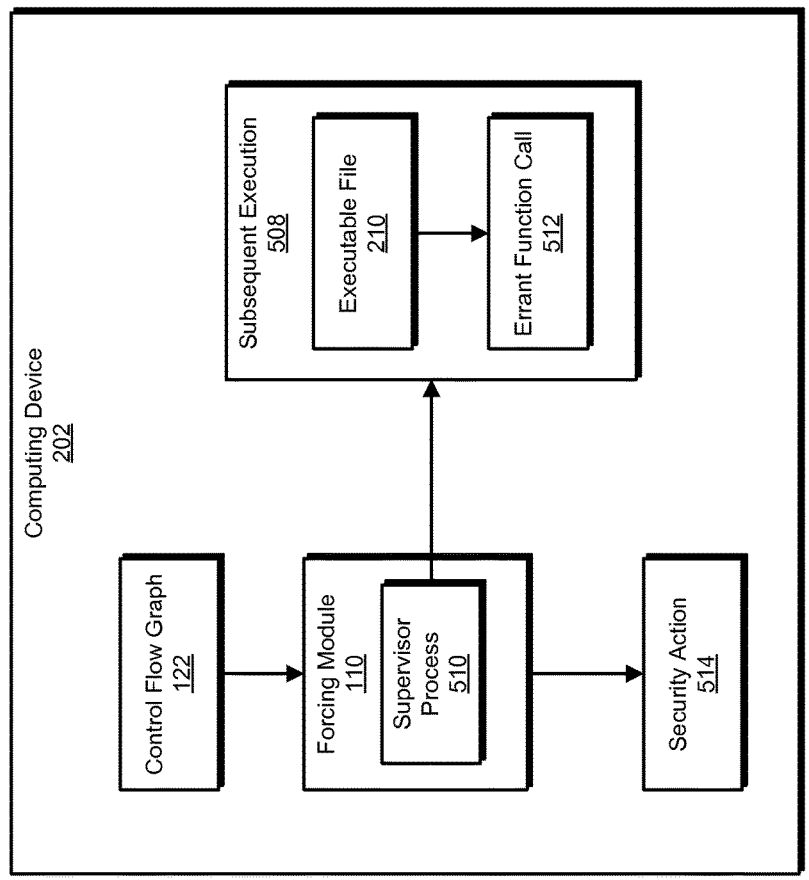
FIG. 5 is a block diagram of an exemplary computing system for enforcing secure software execution.

The following will provide, with reference to FIGS. 1, 2, and 5, detailed descriptions of exemplary systems for enforcing secure software execution. Detailed descriptions of corresponding computer-implemented methods will also be provided in connection with FIG. 3. Detailed descriptions of software execution flows and control flow graphs will be provided in connection with FIG. 4. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for enforcing secure software execution. As illustrated in this figure, exemplary system 100 may include one or more modules 102 for performing one or more tasks. For example, and as will be explained in greater detail below, exemplary system 100 may include a providing module 104 that may provide at least one known benign input to an executable file that is susceptible to abnormal code execution. Exemplary system 100 may additionally include an observing module 106 that may observe a series of function calls made by the executable file as the executable file processes the known benign input. Exemplary system 100 may further include a storing module 108 that may store the series of function calls as a control flow graph that represents known safe function call pathways for the executable file. Moreover, exemplary system 100 may include a forcing module 110 that may force a subsequent execution of the executable file to follow the series of function calls stored in the control flow graph in order to protect the executable file against abnormal code execution. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store a control flow graph 122 that describes sequences of function calls observed by observing module 106. Database 120 may store any number of control flow graphs related to any number of executable files.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to prevent an application from engaging in abnormal code execution. For example, and as will be described in greater detail below, one or more of modules 102 may cause computing device 202 and/or server 206 to enforce secure software execution. For example, and as will be described in greater detail below, providing module 104 may provide a benign input 208 to an executable file 210 that is susceptible to abnormal code execution. Observing module 106 may observe a series of function calls 212 made by executable file 210 while executable file 210 processes benign input 208. Storing module 108 may store series of function calls 212 as control flow graph 122 that represents known safe function call pathways for the executable file. Forcing module 110 may force a subsequent execution of executable file 210 to follow series of function calls 212 stored in control flow graph 122 to protect executable file 210 against abnormal code execution.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of analyzing function calls issued by an executable file and storing the results of the analysis. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Executable file 210 generally represents any set of digitally encoded instructions or software that causes, when executed, a computing device to perform one or more tasks. Executable file 210 may accept an input such as a file, a text string, a function call, a network packet, or any other suitable form of information to be processed by executable file 210. Executable file 210 may, as part of processing the input, call various functions either internally or from external libraries. Examples of executable file 210 include, without limitation, MICROSOFT WORD, ADOBE PHOTO-SHOP, and GOOGLE CHROME.

Benign input 208 generally represents any type or form of input that is known to not cause abnormal behavior (described in greater detail below) in executable file 210. Benign input 208 may take a variety of forms. In some examples, benign input 208 may be a file that has passed a security scan. Additionally or alternatively, benign input 208 may represent a file that was created specifically for use as a test input for observing what functions an executable file calls while processing a benign input. Moreover, benign input 208 may additionally or alternatively represent a file that has a high reputation score (e.g., may be a configuration file that is used by many individual computing systems). As a specific example, a security service provider such as SYMANTEC may create a blank document to use as benign input 208 for an execution of MICROSOFT WORD.

Regardless of the form taken by benign input 208, benign input 208 may be known to not cause abnormal behavior in executable file 210. Examples of abnormal behavior include, without limitation, abnormal memory access, abnormal function calls, execution of abnormal blocks of code, storing information in an abnormal location, behavior that results from a buffer overflow, or any other behavior that a user may not expect from the executable file in question. Specific examples of abnormal behaviors may include an application such as MICROSOFT WORD attempting to save a file to a system directory and/or call functions from a network communication library, as neither of these behaviors may be expected from a word-processing application.

Control flow graph 122 generally represents any type or form of data that acts as a record of at least one series of function calls issued by executable file 210. A particular series of function calls stored as part of a control flow graph may sometimes be referred to as a "control flow." Control flow graph 122 may act as a record of a series of function calls in a variety of ways. For example, control flow graph 122 may contain a single control flow for a particular executable file. Alternatively, control flow graph 122 may contain multiple control flows for an executable file. Moreover, control flow graph 122 may in some examples contain multiple interrelated control flows, such as all control flows observed when processing various benign inputs that share a file type. Additionally or alternatively, control flow graph 122 may contain all control flows observed as executable file 210 processes an assortment of benign inputs of differing file types. In all of the above-described examples, a control flow containing functions in the order A, B, C, then D may be considered distinct from a control flow that contains the same functions in a different order, e.g., D, C, B, then A. Control flow graph 122 may take a variety of forms, including but not limited to: a linked list, a flow chart, a connectivity matrix, a flow tree, combinations of one or more of the same, or any other suitable method of representing a directional flow from one function to another. An illustrated example of a control flow graph will be provided in greater detail below and in connection with FIG. 4.

Figure 3:
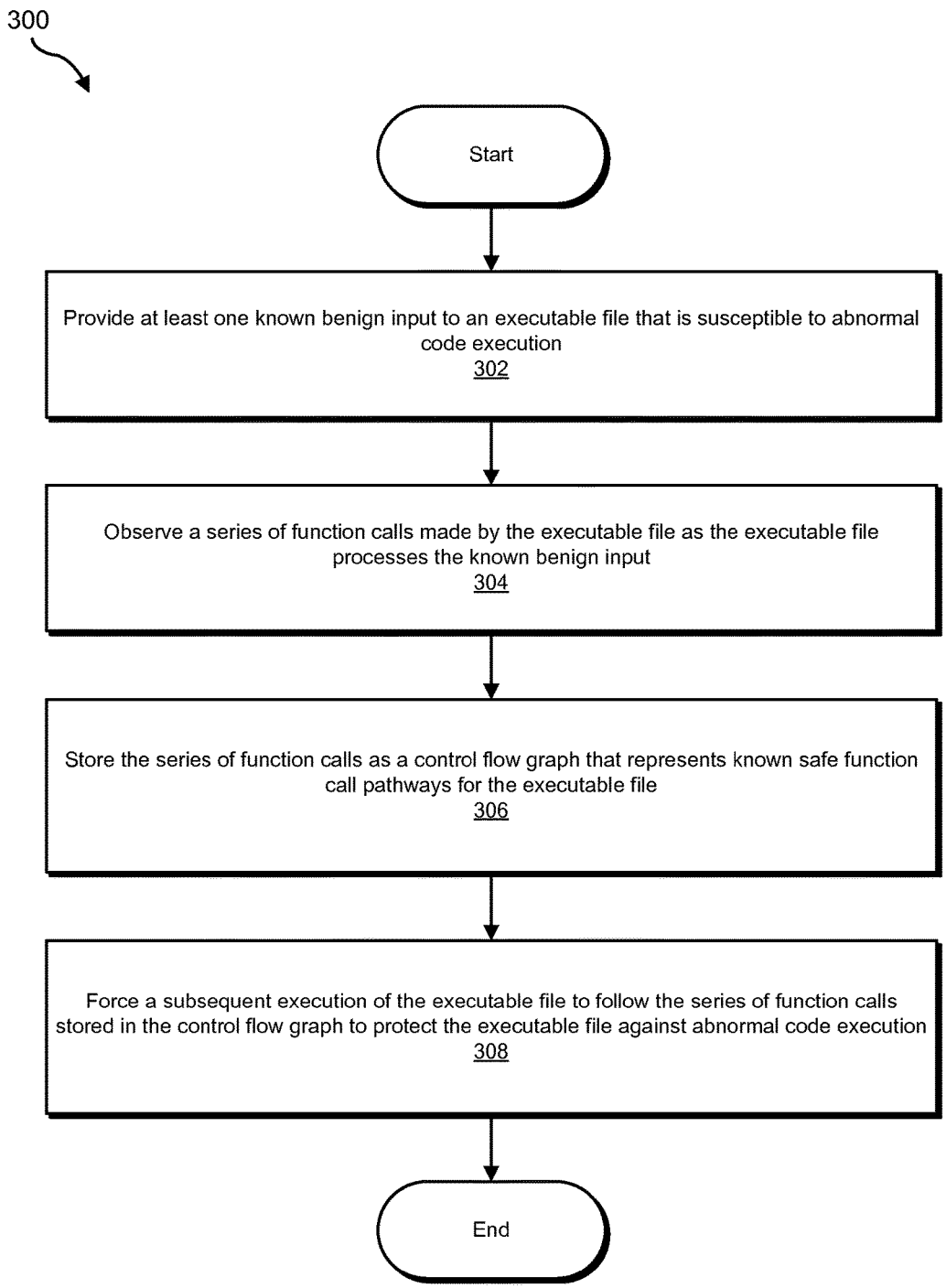
FIG. 3 is a flow diagram of an exemplary method for enforcing secure software execution.

FIG. 3 is a flow diagram of an exemplary computer-implemented method 300 for enforcing secure software execution. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may provide at least one known benign input to an executable file that is susceptible to abnormal code execution. For example, providing module 104 may, as part of server 206 in FIG. 2, provide at least one benign input 208 to executable file 210.

Providing module 104 may provide one or more benign inputs to an executable file in a variety of ways. In some examples, providing module 104 may execute a command-line function that directs executable file 210 to use benign input 208 as an input. Additionally or alternatively, providing module 104 may pass a series of instructions to an API component of executable file 210. Moreover, providing module 104 may, in some examples, invoke a script that causes executable file 210 to process benign input 208.

Additionally, providing module 104 may, in some examples, provide a benign input to an executable file as part of an automated process. For example, providing module 104 may enable a user to queue executable file 210 for automated analysis by a system that incorporates providing module 104 and/or other elements of modules 102. In another example, providing module 104 may, as part of an automated function of a digital security system, identify executable file 210 within a file system and provide executable file 210 with benign input 208.

In some embodiments, providing module 104 may provide multiple benign inputs to an executable file. For example, providing module 104 may provide many benign inputs that are of the same file type to executable file 210. As a specific example, providing module 104 may provide the executable MICROSOFT WORD with a set of benign inputs that are all plain text (.TXT) files. As will be described in greater detail below, by providing a set of benign inputs that share a file type, the systems described herein may strictly enforce proper control flows when executable file 210 processes an unknown input that shares a file type with the set of benign inputs. Additionally or alternatively, providing module 104 may provide executable file 210 with many benign inputs of varying file types. By providing many benign inputs of varying file types, the systems described herein may obtain a more accurate view of how executable file 210 behaves during normal operation, thus enabling the systems described herein to avoid restricting function calls necessary for normal operation of executable file 210.

At step 304, one or more of the systems described herein may observe a series of function calls made by the executable file as the executable file processes the known benign input. For example, observing module 106 may, as part of server 206 in FIG. 2, observe series of function calls 212 made by executable file 210 as executable file 210 processes benign input 208.

Observing module 106 may monitor an executable file in a variety of contexts. For example, observing module 106 may monitor executable file 210 as executable file 210 processes a single benign input. In other examples, observing module 106 may monitor executable file 210 as executable file 210 processes multiple different benign inputs. Moreover, observing module 106 may observe executable file 210 in response to providing module 104 providing benign input 208 to executable file 210.

As an executable file processes a benign input, the executable file may issue a series of function calls. Observing module 106 may observe the series of function calls in a variety of ways. In some examples, observing module 106 may observe series of function calls 212 through a software profiler that records function calls issued by executable file 210. Additionally or alternatively, observing module 106 may use event hooks provided by an operating system that executes observing module 106 that allow observing module 106 to monitor function calls made by executable file 210. In further examples, observing module 106 may use event hooks and/or an application programming interface (API) provided by executable file 210 to monitor function calls issued by executable file 210.

The term "function call," as used herein, generally refers to an attempt by an executable file to access a set of programmed instructions that perform a specific task (i.e., a function). Moreover, the phrase "series of function calls" as used herein generally refers to a sequence of function calls that follow a particular order. For example, exemplary execution flow 410 in FIG. 4 illustrates a series of function calls that may be issued by executable file 210. A series of function calls may be order specific. That is, a series of function calls may be different from a series of function calls that contains the same set of function calls but in a different order. As will be described in greater detail below, the systems described herein may store an observed series of function calls as a control flow graph.

A diagram of an exemplary series of function calls stored as an exemplary control flow graph 400 is shown in connection with FIG. 4. In this example, observing module 106 may observe a series of function calls issued by executable file 210 as executable file 210 processes benign input 208, and storing module 108 (as will be described in greater detail below) may record the observed series of function calls as control flow graph 400. In this illustrated example, executable file 210 may issue a set of prior function calls followed by a function call to open a document at step 402, a function call to parse data at step 404, a function call to load text at step 406, and a function call to load images at step 408. Executable file 210 may then proceed with subsequent function calls.

Returning to FIG. 3 at step 306, one or more of the systems described herein may store the series of function calls as a control flow graph that represents known safe function call pathways for the executable file. For example, storing module 108 may, as part of server 206 in FIG. 2, store series of function calls 212 as control flow graph 122 in database 120.

Storing module 108 may store series of function calls 212 as control flow graph 122 in a variety of ways. For example, storing module 108 may store a single series of function calls as control flow graph 122. For example, storing module 108 may store a series of function calls observed from executable file 210 processing a single benign input as control flow graph 122. Alternatively, storing module 108 may store within control flow graph 122 each series of function calls generated by providing a variety of benign inputs to executable file 210.

In some examples, storing module 108 may create more than one control flow graph associated with executable file 210. For example, providing module 104 may have provided executable file 210 with many benign inputs of various file types. Observing module 106 may observe a different series of function calls for each file type. In such examples, storing module 108 may store each series of function calls as a separate control flow graph and associate each control flow graph with executable file 210 along with information that describes the file type that generated the associated series of function calls. Alternatively, storing module 108 may store more than one observed series of function calls associated with a particular file type within the same control flow graph and/or store more than one observed series of function calls associated with a different file type within a different control flow graph. As will be described in greater detail below, by maintaining different control flow graphs associated with different file types of benign inputs, the systems described herein may efficiently block a wide variety of abnormal code executions from an executable file without sacrificing normal functionality of the executable file.

Returning to FIG. 3 at step 308, one or more of the systems described herein may force a subsequent execution of the executable file to follow the series of function calls stored in the control flow graph to protect the executable file against abnormal code execution. For example, forcing module 110 may, as part of computing device 202 in FIG. 2, force a subsequent execution of executable file 210 to follow series of function calls 212 stored in control flow graph 122 to protect executable file 210 against abnormal code execution.

Forcing module 110 may force subsequent executions of executable file 210 to follow series of function calls 212 stored in control flow graph 122 in a variety of ways. In some examples, forcing module 110 may only have access to a single control flow graph associated with executable file 210. In these examples, forcing module 110 may directly apply control flow graph 122 to executable file 210. In other examples and as briefly described above, storing module 108 may store multiple control flow graphs associated with executable file 210, with each control flow graph representing expected control flows for various file types that might be processed by executable file 210. In these examples, forcing module 110 may apply a control flow graph that is associated with the same file type as an untested input being processed by executable file 210.

Forcing module 110 may apply a control flow graph to an executable file in a variety of ways. In one example, forcing module may apply control flow graph 122 to executable file 210 through a supervisor process. Such a supervisor process (illustrated in FIG. 5) may monitor function calls issued by subsequent executions of executable file 210 and detect an errant function call issued by the subsequent execution. The term "errant function call" as used herein generally refers to a function call issued by an executable file that does not follow the series of function calls outlined in a control flow graph that corresponds to the executable file. For example, executable file 210 may issue an errant function call that does not follow the function calls outlined by series of function calls 212 stored as part of control flow graph 122. In some examples, forcing module 110 may, through the supervisor process, perform a security action in response to detecting errant function calls to protect executions of executable file 210 against abnormal code execution.

For example and with reference to FIG. 5, computing device 202 may perform a subsequent execution 508 of executable file 210. Forcing module 110 may, through a supervisor process 510, monitor subsequent execution 508 for errant function calls. Supervisor process 510 may detect an errant function call 512 issued by executable file 210 during subsequent execution 508 that does not follow the series of functions outlined in control flow graph 122 and accordingly perform a security action 514. As a detailed example, executable file 210 may represent MICROSOFT WORD. Supervisor process 510 may monitor MICROSOFT WORD for behavior that does not match the control flow outlined in control flow graph 122 (e.g., MICROSOFT WORD issuing errant function call 512). In this example, errant function call 512 may include a function call issued as part of MICROSOFT WORD attempting to delete a protected file. Supervisor process 510 may, upon detecting errant function call 512, perform security action 514.

An example of an errant function call is illustrated as part of FIG. 4. As described above, control flow graph 400 may represent a series of function calls observed as an executable file processed a benign input. Execution flow 410 may represent an exemplary set of function calls made by executable file 210 as it processes an untested input. Note that the first three function calls illustrated (e.g., open document 412, parse data 414, and load text 416) match the first three functions illustrated in control flow graph 400. Function calls 412, 414, and 416 may be considered to follow the control flow outlined in control flow graph 400. At step 418 of execution flow 410 however, executable file 210 attempts to call a "save file" function. However, the "save file" function call does not match the corresponding function call located at the same position in control flow graph 400 (i.e., load images 408), thus causing systems described herein to perform an interrupt 420 of execution flow 410. In this example, the function call save file 418 may be considered an errant function call. Forcing module 110 may perform a variety of actions upon detecting the errant function call, such as security action 514 illustrated in FIG. 5.

Returning to FIG. 5, forcing module 110 may perform security action 514 in a variety of ways. In some examples, forcing module 110 may create an entry in a security log that reports that executable file 210 issued errant function call 512. Additionally or alternatively, forcing module 110 may terminate subsequent execution 508. In further examples, forcing module 110 may block errant function call 512. Forcing module 110 may block errant function call 512 in a variety of ways. For example, forcing module 110 may prevent errant function call 512 from resolving. In other examples, forcing module 110 may return an empty function in response to errant function call 512. In some embodiments, forcing module 110 may block or return an empty function to errant function call 512 through the previously discussed supervisor process.

In addition or as an alternative to using a supervisor process, forcing module 110 may apply a control flow graph to an executable file by degrading the executable file to restrict function calls available to the executable file. Forcing module 110 may degrade an executable file in a variety of ways. In some examples, forcing module 110 may degrade executable file 210 as executable file 210 processes an untested input. For example and as described above, forcing module 110 may, through a supervisor process, intercept function calls made by executable file 210 while executable file 210 processes an untested input. In other examples, forcing module 110 may generate a degraded executable file 216, illustrated in FIG. 2. Degraded executable file 216 may represent a copy of executable file 210 with at least one function that is not represented in control flow graph 122 having been degraded. Forcing module 110 may force a subsequent execution of executable file 210 to follow the control flow described in control flow graph 122 by executing degraded executable file 216 in place of executable file 210.

The term "degraded" as used herein generally refers to any technique by which one or more computer-readable instructions are rendered wholly or partially inoperable. Examples of computer-readable instructions that may be degraded include, without limitation, executable files, functions, or any other suitable computer-readable instruction. Forcing module 110 may degrade computer-readable instructions in a variety of ways. For example, forcing module 110 may replace the contents of a function with a null return instruction. In another example, forcing module 110 may degrade an executable file by degrading one or more functions called or contained by the executable file. In further examples, forcing module 110 may degrade a computer-readable instruction during runtime (i.e., while an executable file is operating). In these examples, forcing module 110 may degrade a function call made by the executable file by intercepting the function call and returning a nullified function and/or by preventing the function call from resolving. As described above, forcing module 110 may degrade a function and/or an executable file in order to prevent actions that might harm a user's system.

In some embodiments, a user may decide that errant function call 512 represents behavior that the user expected from executable file 210. In these embodiments, forcing module 110 may request verification from the user that errant function call 512 follows an expected series of function calls that is not stored in control flow graph 122. Upon receiving verification, forcing module 110 may accordingly permit errant function call 512 to resolve normally (e.g., by refraining from degrading the function called by errant function call 512). In some examples, forcing module 110 may additionally store the user-verified series of function calls that includes errant function call 512 as part of control flow graph 122. Obtaining user verification may thus allow forcing module 110 to permit a user to provide input as to what behaviors on the part of executable file 210 constitute normal behavior.

The systems described herein may take a variety of forms. For example, providing module 104, observing module 106, and storing module 108 may execute on a server (e.g., server 206, as illustrated in FIG. 2). In such embodiments, forcing module 110 may execute on a client system that performs the subsequent execution of executable file 210 (e.g., computing device 202, as illustrated in FIG. 2). In these embodiments, forcing module 110 may receive or retrieve control flow graph 122 from server 206 via network 204. In other embodiments, a single computing device (e.g., server 206 or computing device 202) may execute all of modules 102. For example, server 206 may execute all of modules 102. In this example, forcing module 110 may access control flow graph 122 in database 120.

As described in detail above, by examining and recording function calls made by an executable file as it executes under controlled conditions and causing later executions of the executable file to follow the recorded pattern of function calls, the systems and methods described herein may ensure that the later executions of the executable file do not deviate from expected behaviors. In some examples, the systems described herein may provide an input known to only cause expected behaviors to an executable file, observe function calls issued by the executable file as it processes the input, and store the observed series of function calls as a control flow graph. The systems described herein may later use the stored control flow graph to force subsequent executions of the executable file to follow the series of function calls described by the control flow graph. Such dynamic analysis of an executable file may generate a control flow graph that accurately represents the behavior of the executable file as it is used by an end user. In some examples, the analysis of executable files performed by the modules described herein may be faster and more efficient than traditional static analysis of assembly code.

Figure 6:
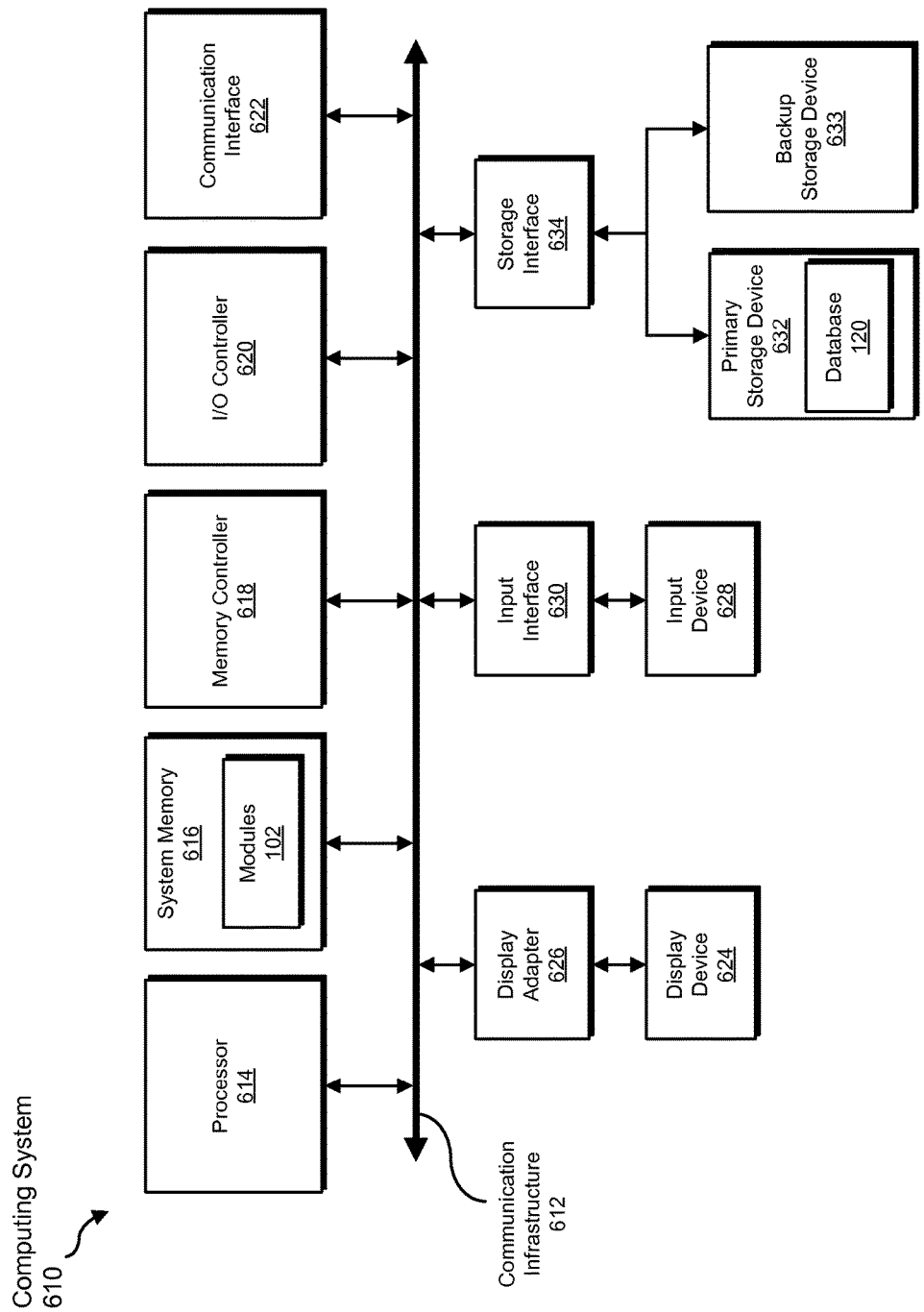
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
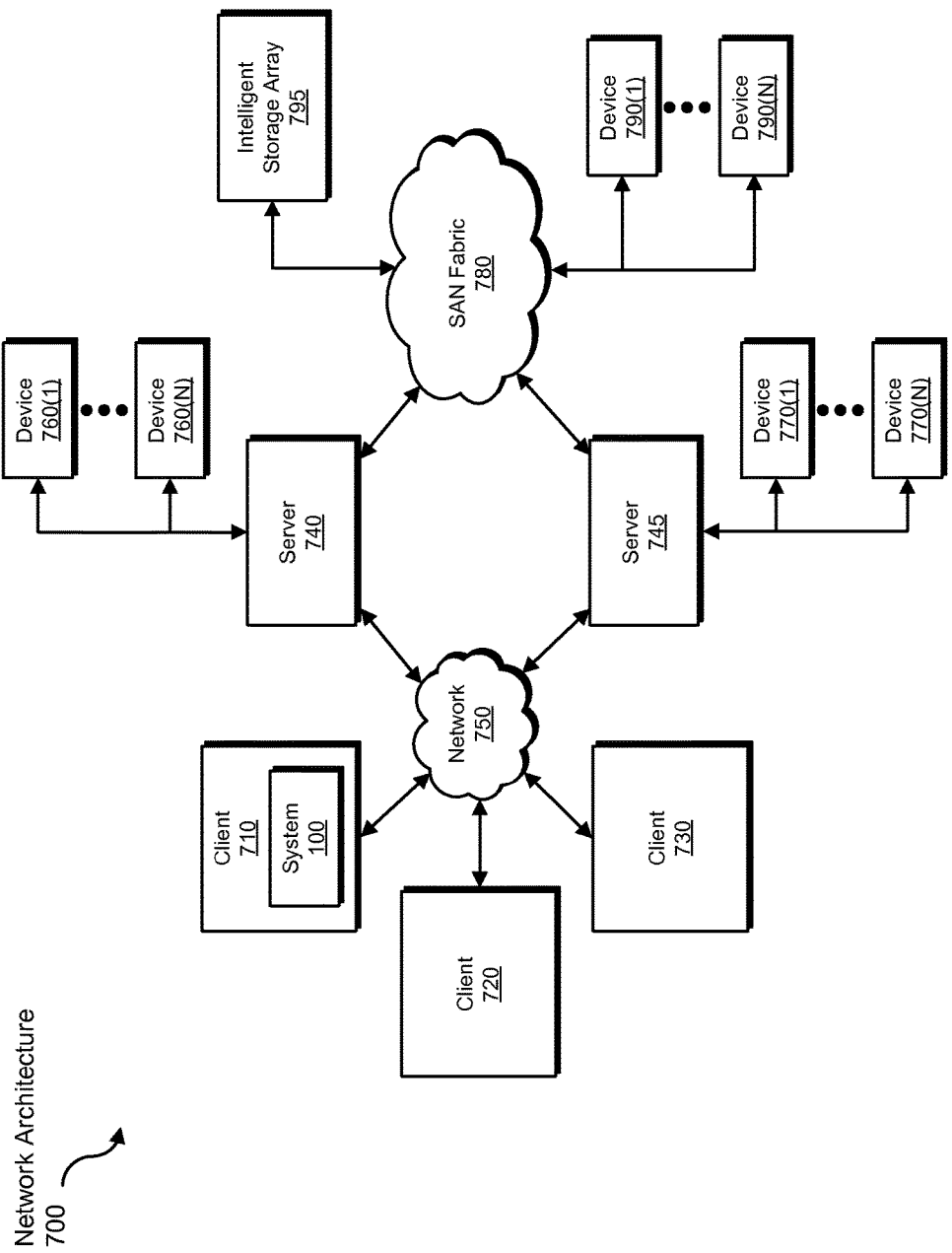
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for enforcing secure software execution.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive inputs to be provided to an executable file, use the executable file to transform the inputs into a series of function calls, record the series of function calls in a database as a control flow graph, output the control flow graph to a client system, use the control flow graph to generate a modified version of an executable file, and/or output the control flow graph and/or the modified version of the executable file to memory. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for enforcing secure software execution, the method being performed by a computing device comprising at least one processor, the method comprising:
    providing a plurality of known benign inputs to an executable file that is susceptible to abnormal code execution;
    observing a plurality of series of function calls made by the executable file as the executable file processes each of the known benign inputs in the plurality of known benign inputs;
    storing the plurality of series of function calls as a plurality of control flow graphs that represents known safe function call pathways for the executable file, wherein each of the known safe function call pathways represents a safe order of function calls and each of the control flow graphs is associated with a file type description; and
    forcing a subsequent execution of the executable file to follow a series of function calls in a safe order of function calls represented by a known safe function call pathway stored in one of the control flow graphs to protect the executable file against the abnormal code execution.

2. The method of claim 1, wherein the forcing step further comprises:
- monitoring, as part of a supervisor process that monitors the executable file, function calls issued by the executable file;
- detecting, as part of the supervisor process, an errant function call issued by the executable file that does not follow the series of function calls stored in the one control flow graph; and
- performing, as part of the supervisor process in response to detecting the errant function call, a security action to protect the executable file against the abnormal code execution.

3. The method of claim 2, wherein performing the security action comprises at least one of:
- blocking the errant function call issued by the executable file;
- creating an entry in a security log that reports the errant function call issued by the executable file; and
- terminating the subsequent execution of the executable file.

4. The method of claim 3, wherein blocking the errant function call issued by the executable file comprises one of:
- blocking the errant function call from resolving; and
- returning an empty function in response to the errant function call.

5. The method of claim 2, wherein performing the security action comprises:
- obtaining verification from a user that the errant function call follows an expected series of function calls that is not stored in the one control flow graph; and
- allowing, in response to receiving the verification, the errant function call.

6. The method of claim 1, wherein the forcing step further comprises degrading the executable file.

7. The method of claim 6, wherein:
- the degrading step comprises generating a degraded executable file that is a copy of the executable file with at least one function of the executable file not represented in the one control flow graph having been degraded; and
- the forcing step further comprises executing the degraded executable file in place of the executable file.

8. The method of claim 1, wherein:
- the providing step, the observing step, and the storing step are performed by a server; and
- the forcing step comprises providing the one control flow graph to a client system that executes the subsequent execution of the executable file.

9. The method of claim 1, wherein the forcing step further comprises:
- determining that a type of an untested input provided to the subsequent execution of the executable file matches a file type associated with a particular control flow graph in the plurality of control flow graphs; and
- using the particular control flow graph as the one control flow graph.

10. A system for enforcing secure software execution, the system comprising:
- a providing module, stored in memory, that provides a plurality of known benign inputs to an executable file that is susceptible to abnormal code execution;
- an observing module, stored in memory, that observes a plurality of series of function calls made by the executable file as the executable file processes each of the known benign inputs in the plurality of known benign inputs;
- a storing module, stored in memory, that stores the plurality of series of function calls as a plurality of control flow graphs that represent known safe function call pathways for the executable file, wherein each of the known safe function call pathways represents a safe order of function calls and each of the control flow graphs is associated with a file type description;
- a forcing module, stored in memory, that forces a subsequent execution of the executable file to follow a series of function calls in a safe order of function calls represented by a known safe function call pathway stored in one of the control flow graphs to protect the executable file against the abnormal code execution; and
- at least one physical processor configured to execute the providing module, the observing module, the storing module, and the forcing module.

11. The system of claim 10, wherein the forcing module forces the subsequent execution of the executable file to follow the series of function calls stored in the one control flow graph by:
- monitoring, as part of a supervisor process that monitors the executable file, function calls issued by the executable file;
- detecting, as part of the supervisor process, an errant function call issued by the executable file that does not follow the series of function calls stored in the one control flow graph; and
- performing, as part of the supervisor process in response to detecting the errant function call, a security action to protect the executable file against the abnormal code execution.

12. The system of claim 11, wherein the forcing module performs the security action by at least one of:
- blocking the errant function call issued by the executable file;
- creating an entry in a security log that reports the errant function call issued by the executable file; and
- terminating the subsequent execution of the executable file.

13. The system of claim 12, wherein the forcing module blocks the errant function call by one of:
- blocking the errant function call from resolving; and
- returning an empty function in response to the errant function call.

14. The system of claim 11, wherein the forcing module performs the security action by:
- obtaining verification from a user that the errant function call follows an expected series of function calls that is not stored in the one control flow graph; and
- allowing, in response to receiving the verification, the errant function call.

15. The system of claim 10, wherein the forcing module forces the subsequent execution of the executable file to follow the series of function calls stored in the one control flow graph by degrading the executable file.

16. The system of claim 15, wherein the forcing module:
- degrades the executable file by generating a degraded executable file that is a copy of the executable file with at least one function of the executable file not represented in the one control flow graph having been degraded; and
- forces the subsequent execution of the executable file to follow the series of function calls stored in the one control flow graph further by executing the degraded executable file in place of the executable file.

17. The system of claim 10, wherein:
the providing module, the observing module, and the storing module are executed by a server; and
the forcing module forces the subsequent execution of the executable file to follow the series of function calls stored in the one control flow graph by providing the one control flow graph to a client system that executes the subsequent execution of the executable file.

18. The system of claim 10, wherein the forcing module forces the subsequent execution of the executable file to follow the series of function calls stored in the one control flow graph by:
determining that a type of an untested input provided to the subsequent execution of the executable file matches a file type associated with a particular control flow graph in the plurality of control flow graphs; and
using the particular control flow graph as the one control flow graph.

19. A non-transitory computer-readable medium comprising one or more computer-readable instructions that, when executed by at least one processor of a computing device, cause the computing device to:
provide a plurality of known benign inputs to an executable file that is susceptible to abnormal code execution;
observe a plurality of series of function calls made by the executable file as the executable file processes each of the known benign inputs in the plurality of known benign inputs;
store the plurality of series of function calls as a plurality of control flow graphs that represents known safe function call pathways for the executable file, wherein each of the known safe function call pathways represents a safe order of function calls, and each of the control flow graphs is associated with a file type description; and
force a subsequent execution of the executable file to follow a series of function calls in a safe order of function calls represented by a known safe function call pathway stored in one of the control flow graphs to protect the executable file against the abnormal code execution.

20. The non-transitory computer-readable medium of claim 19, wherein the one or more computer-readable instructions cause the computing device to force the subsequent execution of the executable file to follow the series of function calls stored in the one control flow graph by:
monitoring, as part of a supervisor process that monitors the executable file, function calls issued by the executable file;
detecting, as part of the supervisor process, an errant function call issued by the executable file that does not follow the series of function calls stored in the one control flow graph; and
performing, as part of the supervisor process in response to detecting the errant function call, a security action to protect the executable file against the abnormal code execution.

* * * * *

UNITED STATES PATENT AND TRADEMARK OFFICE
CERTIFICATE OF CORRECTION

PATENT NO. : 9,953,158 B1
APPLICATION NO. : 14/691602
DATED : April 24, 2018
INVENTOR(S) : Benameur et al.

Page 1 of 1

It is certified that error appears in the above-identified patent and that said Letters Patent is hereby corrected as shown below:

On the Title Page

In item (72), under "Inventors", in Column 1, Line 1, delete "Fairfaix Station," and insert -- Fairfax Station, --, therefor.

Signed and Sealed this
Seventh Day of August, 2018

Andrei Iancu
*Director of the United States Patent and Trademark Office*